(12) United States Patent
Nam et al.

(10) Patent No.: US 12,022,458 B2
(45) Date of Patent: Jun. 25, 2024

(54) TRANSMITTER DIRECT CURRENT SUBCARRIER LOCATION INDICATION IN WIRELESS COMMUNICATION

(71) Applicant: QUALCOMM Incorporated, San Diego, CA (US)

(72) Inventors: Wooseok Nam, San Diego, CA (US); Peter Gaal, San Diego, CA (US); Peter Pui Lok Ang, San Diego, CA (US); Timo Ville Vintola, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 17/458,212

(22) Filed: Aug. 26, 2021

(65) Prior Publication Data

US 2022/0070891 A1 Mar. 3, 2022

Related U.S. Application Data

(60) Provisional application No. 63/071,990, filed on Aug. 28, 2020.

(51) Int. Cl.
*H04W 72/12* (2023.01)
*H04W 72/044* (2023.01)
*H04W 72/1263* (2023.01)
*H04W 72/21* (2023.01)
*H04L 5/00* (2006.01)

(52) U.S. Cl.
CPC ..... *H04W 72/1263* (2013.01); *H04W 72/044* (2013.01); *H04W 72/21* (2023.01); *H04L 5/001* (2013.01)

(58) Field of Classification Search
None
See application file for complete search history.

(56) References Cited

U.S. PATENT DOCUMENTS

| 2018/0279310 | A1  | 9/2018  | Chen et al. |
| 2019/0045533 | A1* | 2/2019  | Chatterjee ............. H04L 5/0053 |
| 2019/0103954 | A1* | 4/2019  | Lee ....................... H04L 5/0098 |
| 2019/0313394 | A1* | 10/2019 | Kubota ............. H04W 72/0453 |

(Continued)

FOREIGN PATENT DOCUMENTS

WO WO-2021176702 A1 * 9/2021

OTHER PUBLICATIONS

International Search Report and Written Opinion—PCT/US2021/048045—ISA/EPO—dated Jan. 17, 2022.

(Continued)

*Primary Examiner* — Kodzovi Acolatse
(74) *Attorney, Agent, or Firm* — Loza & Loza, LLP

(57) ABSTRACT

A user equipment (UE) can report direct current (DC) subcarrier location information for a subset of possible combinations of bandwidth parts and component carriers supported by a base station. In one aspect, the UE can receive, from a scheduling entity, a message for activating a first combination of bandwidth parts (BWPs) and component carriers (CCs) in a list including a subset of combinations of BWPs and CCs configured for the UE. The UE can report direct current subcarrier location information for the first combination of BWPs and CCs to the scheduling entity.

24 Claims, 13 Drawing Sheets

(56) References Cited

U.S. PATENT DOCUMENTS

| | | | | |
|---|---|---|---|---|
| 2020/0252822 | A1* | 8/2020 | Kim | H04W 24/08 |
| 2020/0351069 | A1* | 11/2020 | Grant | H04L 5/0092 |
| 2021/0067979 | A1* | 3/2021 | Rahman | H04L 5/0023 |
| 2021/0235500 | A1* | 7/2021 | Hong | H04W 76/18 |
| 2022/0124666 | A1* | 4/2022 | Vintola | H04W 64/003 |
| 2023/0020414 | A1* | 1/2023 | Harada | H04W 72/23 |
| 2023/0131328 | A1* | 4/2023 | Zhang | H04L 5/0098 |
| | | | | 370/329 |

OTHER PUBLICATIONS

Qualcomm Incorporated: "DC Location Reporting for Intra-Band UL CA", 3GPP Draft, R2-2100480, 3GPP TSG-RAN WG1 Meeting #113-e, 3rd Generation Partnership Project (3GPP), Mobile Competence Centre, 650, Route Des Lucioles, F-06921 Sophia-Antipolis Cedex, France, vol. RAN WG2, No. Electronic, Jan. 25, 2021-Feb. 5, 2021, Jan. 15, 2021 (Jan. 15, 2021), XP051973657, 5 Pages, Retrieved from the Internet: URL: https://ftp.3gpp.org/tsg_ran/WG2_RL2/TSGR2_113-e/Docs/R2-2100480.zip R2-2100480.docx [retrieved on Jan. 15, 2021] Sections 1, 2, table 1.

* cited by examiner

TRANSMITTER DIRECT CURRENT SUBCARRIER LOCATION INDICATION IN WIRELESS COMMUNICATION

PRIORITY CLAIM

This application claims priority to and the benefit of provisional application No. 63/071,990 filed in the United States Patent Office on Aug. 28, 2020, the entire content of which is incorporated herein by reference as if fully set forth below in its entirety and for all applicable purposes.

TECHNICAL FIELD

The technology discussed below relates generally to wireless communication systems, and more particularly, to the reporting of direct current subcarrier location.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An exemplary telecommunication standard is 5G New Radio (5G NR). 5G NR is part of a continuous mobile broadband evolution promulgated by the Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable, low-latency communications (URLLC). Some aspects of 5G NR may be based on the 4G Long Term Evolution (LTE) standard. 5G NR can support carrier aggregation. In that case, multiple contiguous or non-contiguous component carriers (CCs) may share the same RF front end circuitry. In some examples, a direct current (DC) subcarrier location may correspond to the local oscillator (LO) frequency of the RF front circuitry.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various method, system, device, and apparatus implementations relate to direct current (DC) subcarrier location reporting in wireless communication. In some aspects, a user equipment (UE) can report the DC subcarrier location information for only a subset of possible combinations of bandwidth parts and component carriers supported by a base station.

One aspect of the disclosure provides a method for wireless communication at a user equipment (UE) configured for wireless communication. The method includes receiving, from a scheduling entity, a message for activating a first combination of bandwidth parts (BWPs) and component carriers (CCs) in a list including a subset of combinations of BWPs and CCs configured for the UE. The method further includes reporting direct current subcarrier location information for the first combination of BWPs and CCs to the scheduling entity.

Another aspect of the disclosure provides a user equipment (UE) for wireless communication. The UE includes a wireless transceiver configured for wireless communication with a scheduling entity, a memory, and a processor communicatively coupled to the wireless transceiver and the memory. The processor and the memory are configured to receive, from the scheduling entity, a message for activating a first combination of bandwidth parts (BWPs) and component carriers (CCs) in a list including a subset of combinations of BWPs and CCs configured for the UE. The processor and the memory are further configured to report direct current subcarrier location information for the first combination of BWPs and CCs to the scheduling entity.

Another aspect of the disclosure provides a method for wireless communication at a base station configured for wireless communication. The method includes transmitting, to a user equipment (UE), a message for activating a first combination of bandwidth parts (BWPs) and component carriers (CCs) in a list including a subset of combinations of BWPs and CCs configured for the UE. The method further includes receiving direct current subcarrier location information for the first combination of BWPs and CCs from the UE.

Another aspect of the disclosure provides a base station for wireless communication. The base station includes a wireless transceiver, a memory, and a processor communicatively coupled to the wireless transceiver and the memory. The processor and the memory are configured to transmit, to a user equipment (UE), a message for activating a first combination of bandwidth parts (BWPs) and component carriers (CCs) in a list including a subset of combinations of BWPs and CCs configured for the UE. The processor and the memory are further configured to receive direct current subcarrier location information for the first combination of BWPs and CCs from the UE.

These and other aspects of the invention will become more fully understood upon a review of the detailed description, which follows. Other aspects, features, and implementations will become apparent to those of ordinary skill in the art, upon reviewing the following description of specific, exemplary implementations in conjunction with the accompanying figures. While features may be discussed relative to certain implementations and figures below, all implementations can include one or more of the advantageous features discussed herein. In other words, while one or more implementations may be discussed as having certain advantageous features, one or more of such features may also be used in accordance with the various implementations discussed herein. In similar fashion, while exemplary implementations may be discussed below as device, system, or method implementations it should be understood that such exemplary implementations can be implemented in various devices, systems, and methods.

DETAILED DESCRIPTION

Figure 1:
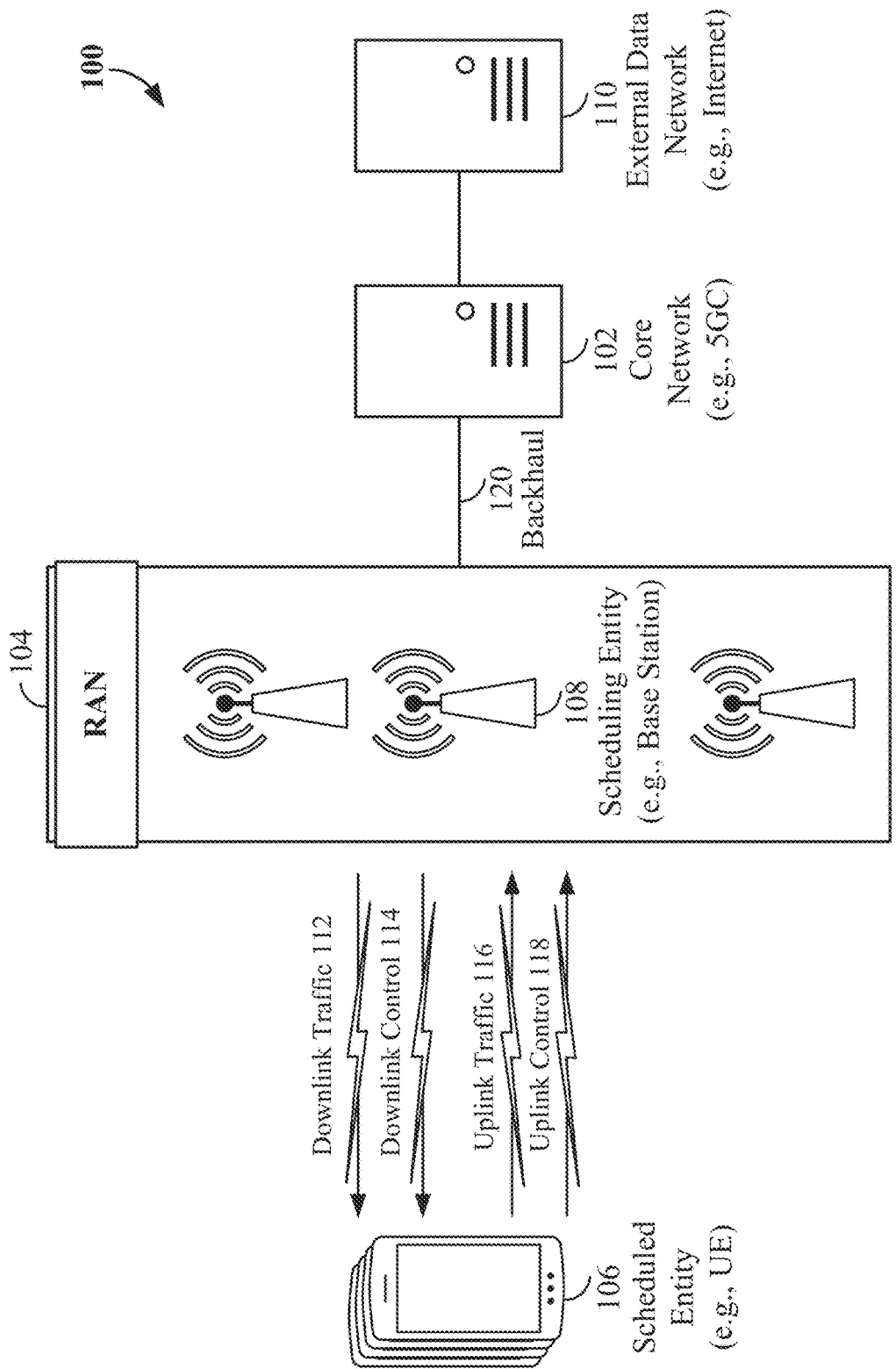
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described implementations. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, FR2, FR4, FR4-a or FR4-1, and/or FR5. In addition, NR is designed to operate across different spectrum types, from licensed spectrum to unlicensed and shared spectrum.

While the use of higher frequencies (e.g., above FR2) can provide a greater transmission capacity, phase noise levels may increase with the higher frequencies. Phase noise can impact the performance of certain wireless communication systems. Accordingly, a transmitter may transmit a reference signal, such as a phase tracking reference signal (PTRS), to facilitate phase noise estimations and corrections at a receiver.

Depending on the location of a reference signal within radio frequency (RF) resources, however, a receiver may be unable to efficiently receive the reference signal due to interference with tones within the resources. For example, a direct current (DC) frequency tone or carrier can have a large, negative impact on the performance of a baseband receiver. The DC frequency tone can cause high interference and/or high noise for signal processing and/or a worse error vector magnitude (EVM) at the receiver. Some receivers may apply DC rejection filtering or puncturing to disregard the tone affected by DC. As such, to enable a receiver to efficiently receive a reference signal, a transmitter may avoid transmitting a reference signal using frequency resources that overlap with the DC carrier location of the receiver.

In certain wireless communication devices or user equipment devices (UEs), the DC carrier location may be dependent on the receiver's implementation. For example, in an NR network, a base station may configure a UE for communications in various bandwidth parts (BWPs) within various component carriers (CC). Different UEs may have different radio frequency (RF) receiver implementations. For example, some UEs may use a single RF and/or baseband chains for all CCs and/or all BWPs, while other UEs may use different RF and/or baseband chains for different CCs and/or different BWPs. Thus, the DC carrier location may vary among different UEs, as well as within the same UE depending on the RF front end configuration in use. Accordingly, a network may determine reference signal configurations according to DC carrier locations of UEs.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control information 114 and/or 118 and/or traffic information 112 and/or 116 may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per subcarrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
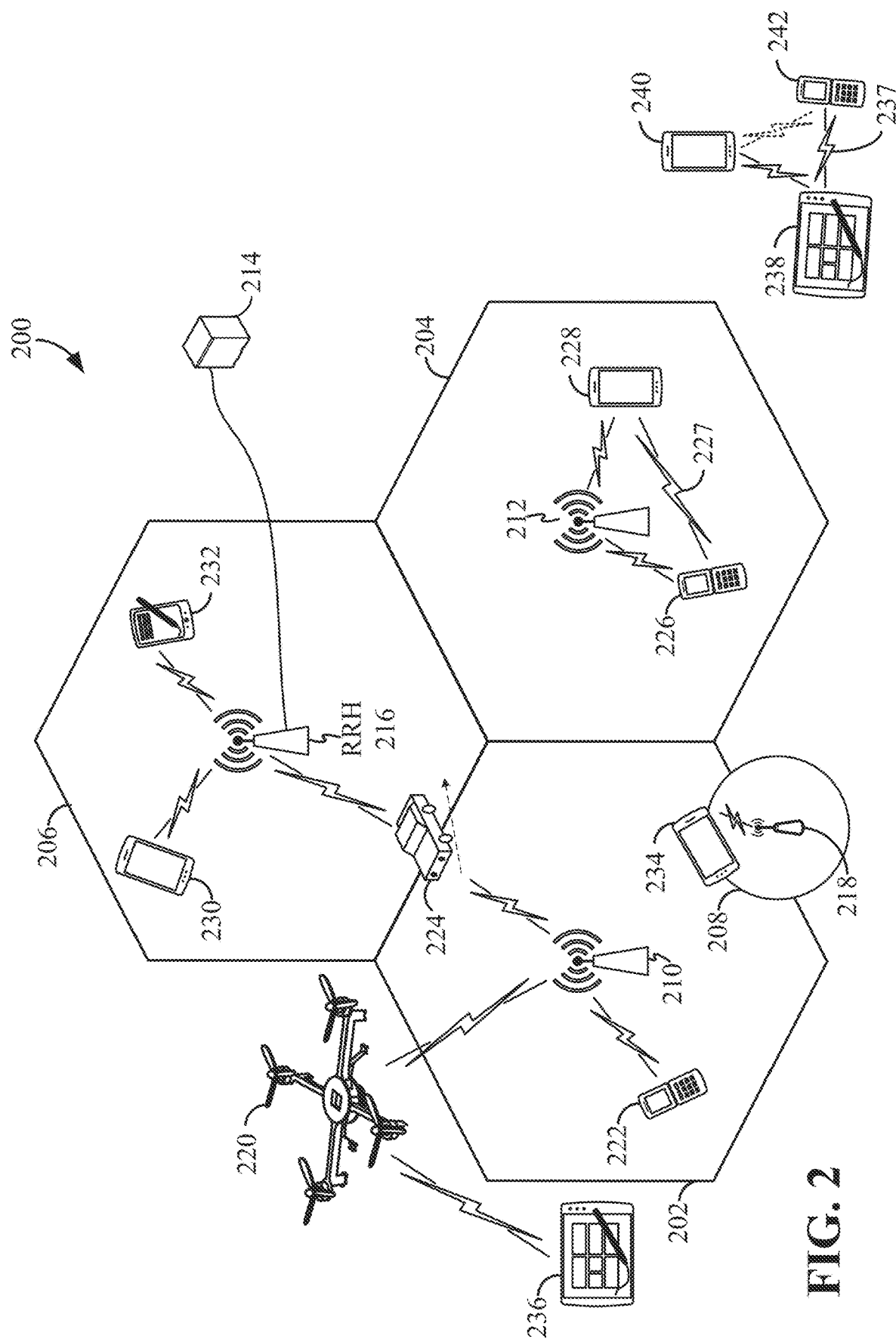
FIG. 2 is an illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a unmanned aerial vehicle (UAV) 220, which may be a quadcopter or drone. The UAV 220 may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, the UAV 220 (e.g., quadcopter) may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) and a security anchor function (SEAF) that perform authentication. The SCMF can manage, in whole or in part, the security context for both the control plane and the user plane functionality.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

The air interface in the radio access network 200 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Further, the air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
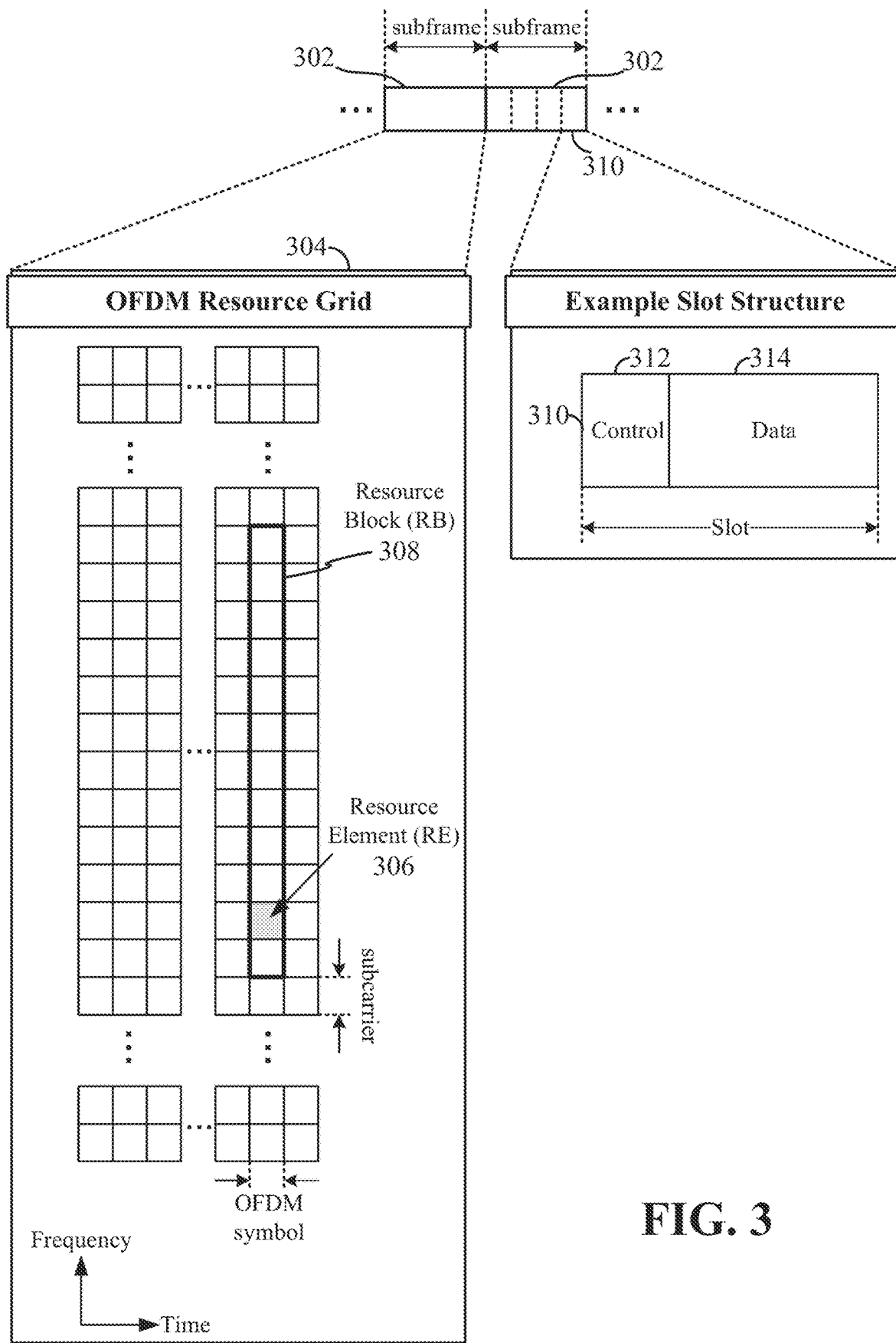
FIG. 3 is a diagram illustrating an example of a frame structure for use in a radio access network according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310. These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
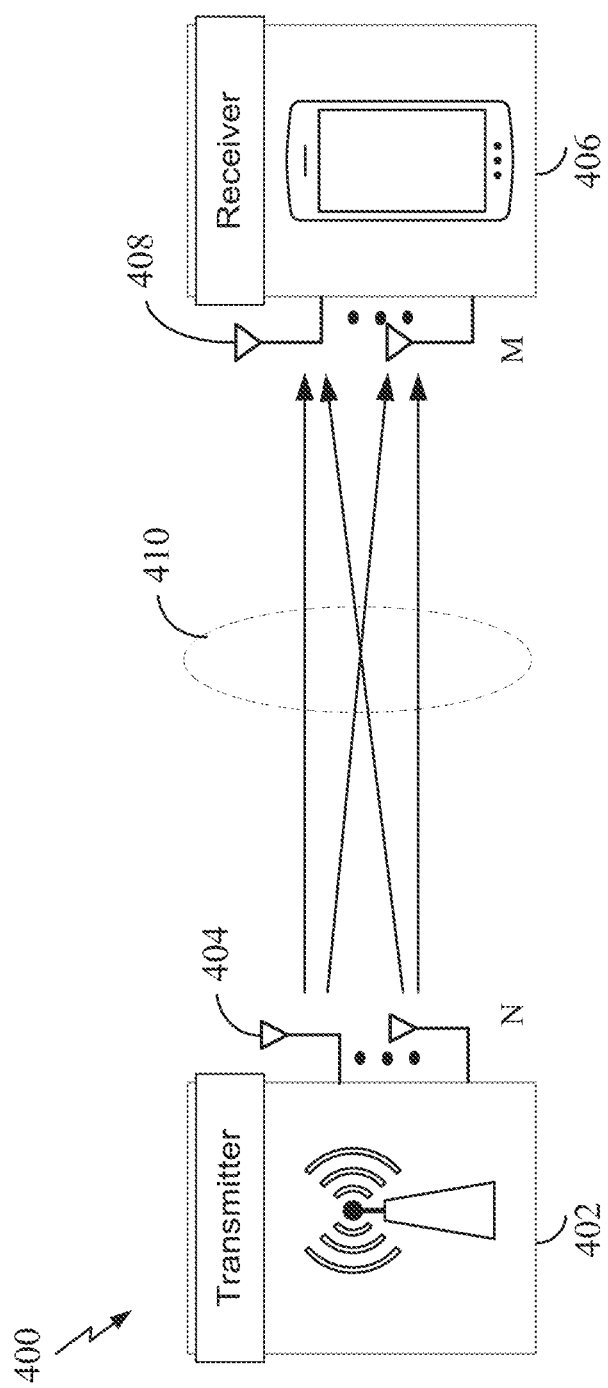
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit CSI-RSs with separate C-RS sequences for each layer to provide for multi-layer channel estimation. From the CSI-RS, the UE may measure the channel quality across layers and resource blocks and feed back the RI and a channel quality indicator (CQI) that indicates to the base station a modulation and coding scheme (MCS) to use for transmissions to the UE for use in updating the rank and assigning REs for future downlink transmissions.

In the simplest case, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In 5G New Radio (NR) systems, particularly for FR2 (millimeter wave) systems, beamformed signals may be utilized for most downlink channels, including the physical downlink control channel (PDCCH) and physical downlink shared channel (PDSCH). In addition, broadcast control information, such as the synchronization signal block (SSB), slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink signals and channels, including the physical uplink control channel (PUCCH), physical uplink shared channel (PUSCH), and sounding reference signal (SRS). In addition, beamformed signals may further be utilized in D2D systems, such as NR sidelink (SL) or V2X, utilizing FR2.

5G NR networks may provide various services associated with eMBB that can satisfy advanced and diverse system requirements, and that can support communication with premium UEs, including UEs configured for eMBB, URLLC, V2X, etc. In many use cases or applications of 5G NR, peak capabilities are not required and/or UEs need not be as capable as premium UEs. 5G NR can be scaled to enable efficient and cost-effective deployment in applications where peak throughput, latency, reliability, and/or other requirements can be relaxed. In some instances, a scalable 5G NR implementation can optimize cost and efficiency in terms of power consumption and system overhead, for example.

5G NR networks may implement a set of features, which may be referred to as NR-Light, that supports reduced complexity and/or reduced capability (RedCap) UEs. In some examples, RedCap UEs may include wearable devices, industrial sensors, video surveillance devices (e.g., stationary cameras), and/or other suitable devices. As compared to standard UEs (e.g., smartphones), reduced complexity UEs may have a lower wireless transmission power, fewer antennas (e.g., antennas for transmitting and/or receiving), a reduced bandwidth for wireless transmission and/or reception, reduced computational complexity/memory, and/or longer battery life.

A reduced complexity and/or reduced capability UE may support a reduced maximum bandwidth (BW). Certain conventional 5G NR protocols or standards may require the UE to support a maximum channel BW defined for the bands in which it operates. In one example, the UE may be required to support a 50 MHz channel bandwidth for 15 kHz subcarrier spacing (SCS) and 100 MHz channel bandwidth for 30/60 kHz SCS (e.g., for Band n78, which may be 3300 MHz-3800 MHz). A 5G NR-Light or reduced capability UE may support a narrower bandwidth, for example, in the range of 5.0 MHz to 20 MHz.

In various implementations, a reduced capability 5G NR-Light UE may be equipped with a single antenna for receiving signals. The limitation to a single receiving antenna reduces diversity in DL signaling. Diversity can improve reliability of the system when, for example, data-encoded signals propagate over multiple paths. DL spatial diversity can be obtained when multiple receive antennas are used to receive DL signals from multiple different propagation paths.

5G NR networks may support very large operating bandwidths relative to previous generations of cellular networks (e.g., LTE). However, requiring a UE to operate across the entire bandwidth of a 5G NR network may introduce unnecessary complexities to the operation of the UE and may significantly increase a UE's power consumption. Therefore, to avoid the need for the operating bandwidth of a UE to match the full bandwidth (also referred to as a carrier bandwidth or a component carrier bandwidth) of a cell in a 5G NR network, 5G NR permits certain UEs (e.g., NR-Light UE) to operate with a narrower bandwidth (e.g., one or more BWPs) than the full bandwidth of a cell or RAN. In some examples, BWPs may allow UEs with different bandwidth capabilities to operate in a cell with smaller instantaneous bandwidths relative to the full bandwidth configured for the cell. In some examples, a UE may not be required to transmit and/or receive outside of the BWP assigned to the UE (also referred to as an active BWP of the UE).

In some examples, for a paired spectrum, a serving cell may configure a maximum of four DL BWPs and four UL BWPs. For an unpaired spectrum, a serving cell may configure a maximum of four DL/UL BWP pairs. For a supplementary uplink (SUL), a serving cell may configure a maximum of 4 UL BWPs.

In some examples, for FDD, a serving cell may support separate sets of BWP configurations for DL and UL per component carrier (CC). DL and UL BWPs may be configured separately and independently for each UE-specific serving cell. The numerology of a DL BWP configuration may apply to PDCCH and PDSCH. The numerology of an UL BWP configuration may apply to PUCCH and PUSCH.

In some examples, for TDD, a serving cell may support a joint set of BWP configurations for DL and UL per CC. DL and UL BWPs may be jointly configured as a pair, with the restriction that the DL/UL BWP pair shares the same center frequency but may be of different bandwidths for each UE-specific serving cell for a UE. The numerology of the DL/UL BWP configuration may apply to PDCCH, PDSCH, PUCCH, and PUSCH. For a UE, if different active DL and UL BWPs are configured, the UE is not expected to retune the center frequency of the channel bandwidth between DL and UL.

In some implementations, the UE tunes its RF front end (e.g., antenna) for the allocated BWP (e.g., an active BWP) and is expected to perform channel state information (CSI) measurements only within its active DL BWP. For example, a UE may be configured with a single active BWP through radio resource control (RRC) signaling. The UE may not be expected to receive any physical channels or signals (e.g., PDSCH, PDCCH, or a CSI-RS) outside its active BWP. In some configurations, a periodic or semi-persistent CSI report associated with a DL BWP may be scheduled for reporting at a certain time (e.g., during a slot n). In these configurations, a UE may transmit the periodic or semi-persistent CSI report only if the associated DL BWP was the active DL BWP in the time location of the CSI reference resource (e.g., slot) for the periodic or semi-persistent CSI report. In some configurations, for aperiodic CSI report triggering, a single set of CSI triggering states may be configured through RRC signaling. The CSI triggering states may be associated with either candidate DL BWP. A UE may not be expected to be triggered with a CSI report for a non-active DL BWP. When a UE performs a measurement or transmits an SRS outside of its active BWP, it is considered a measurement gap. During the measurement gap, the UE is not expected to monitor a control resource set (CORESET).

Figure 5:
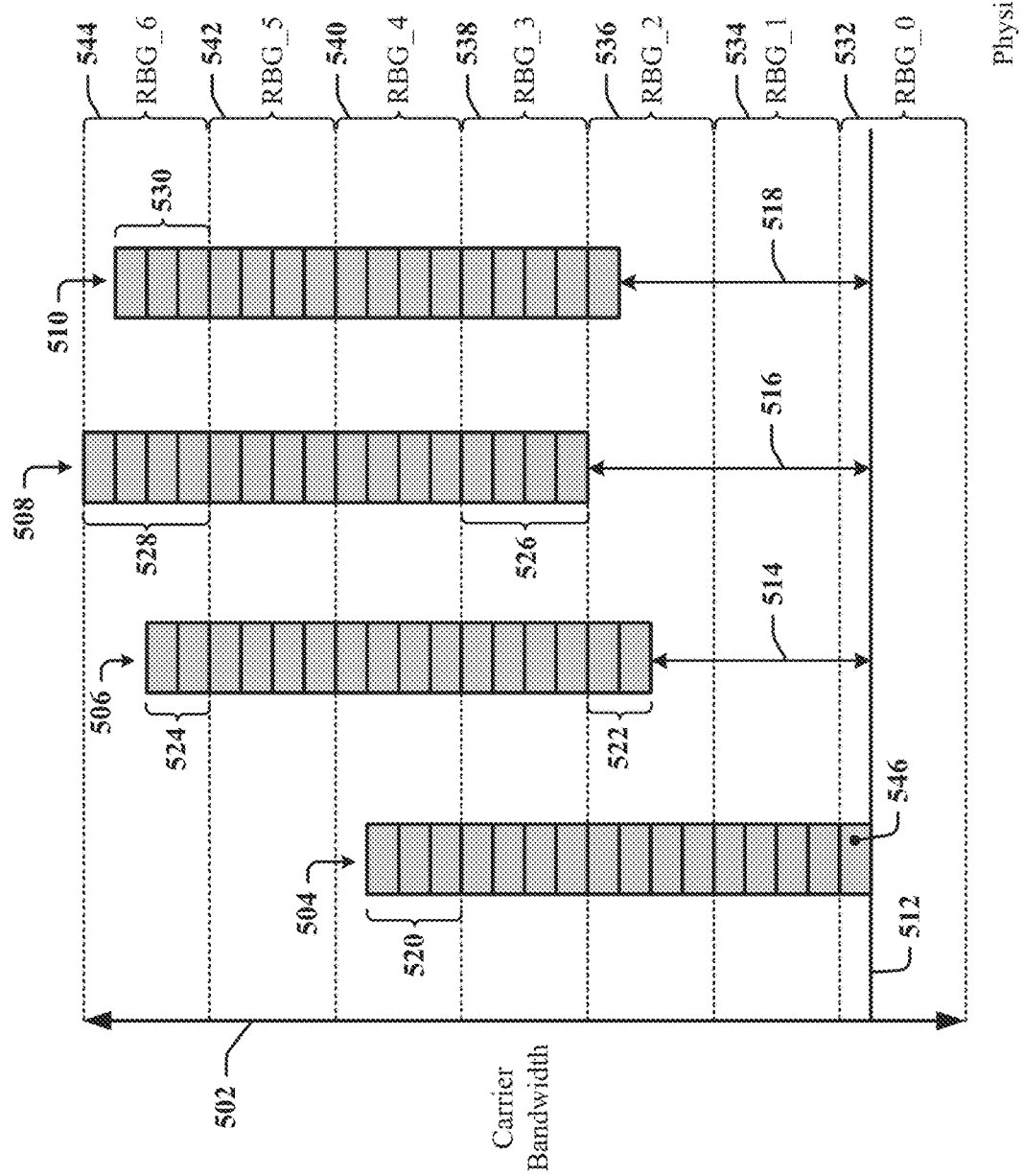
FIG. 5 illustrates an example of a physical resource block grid within a carrier bandwidth of a 5G NR network that may be configured according to some aspects.

FIG. 5 provides an example of a physical resource block (PRB) grid 500 within a carrier bandwidth 502 of a 5G NR network in accordance with various aspects of the disclosure. As shown in FIG. 5, the PRB grid 500 includes seven resource block groups (RBGs), such as RBG_0 532, RBG_1 534, RBG_2 536, RBG_3 538, RBG_4 540, RBG_5 542, RBG_6 544. In the example implementation of FIG. 5, each RBG includes four PRBs (e.g., RBG size=4). As further shown in FIG. 5, the PRB grid 500 includes BWPs 504, 506, 508 and 510. In the example implementation of FIG. 5, each of the BWPs 504, 506, 508 and 510 includes 16 PRBs.

In one example, a UE may be configured with an active BWP 504, and each of the other BWPs 506, 508 and 510 may be configured with a frequency domain (FD) offset 514, 516, 518 relative to the active BWP 504. The FD offsets 514, 516, 518 may be indicated as a number (M) of PRBs, which may be a positive or negative integer. In the illustrated example, a first FD offset 514 may be 7 PRBs (e.g., M=7) relative to a starting PRB 546 of the active BWP 504 as indicated by line 512, a second FD offset 516 may be 9 PRBs (e.g., M=9) relative to the starting PRB 546 of the active BWP 504, and a third FD offset 518 may be 8 PRBs (e.g., M=8) relative to the starting PRB 546 of the active BWP 504.

Figure 6:
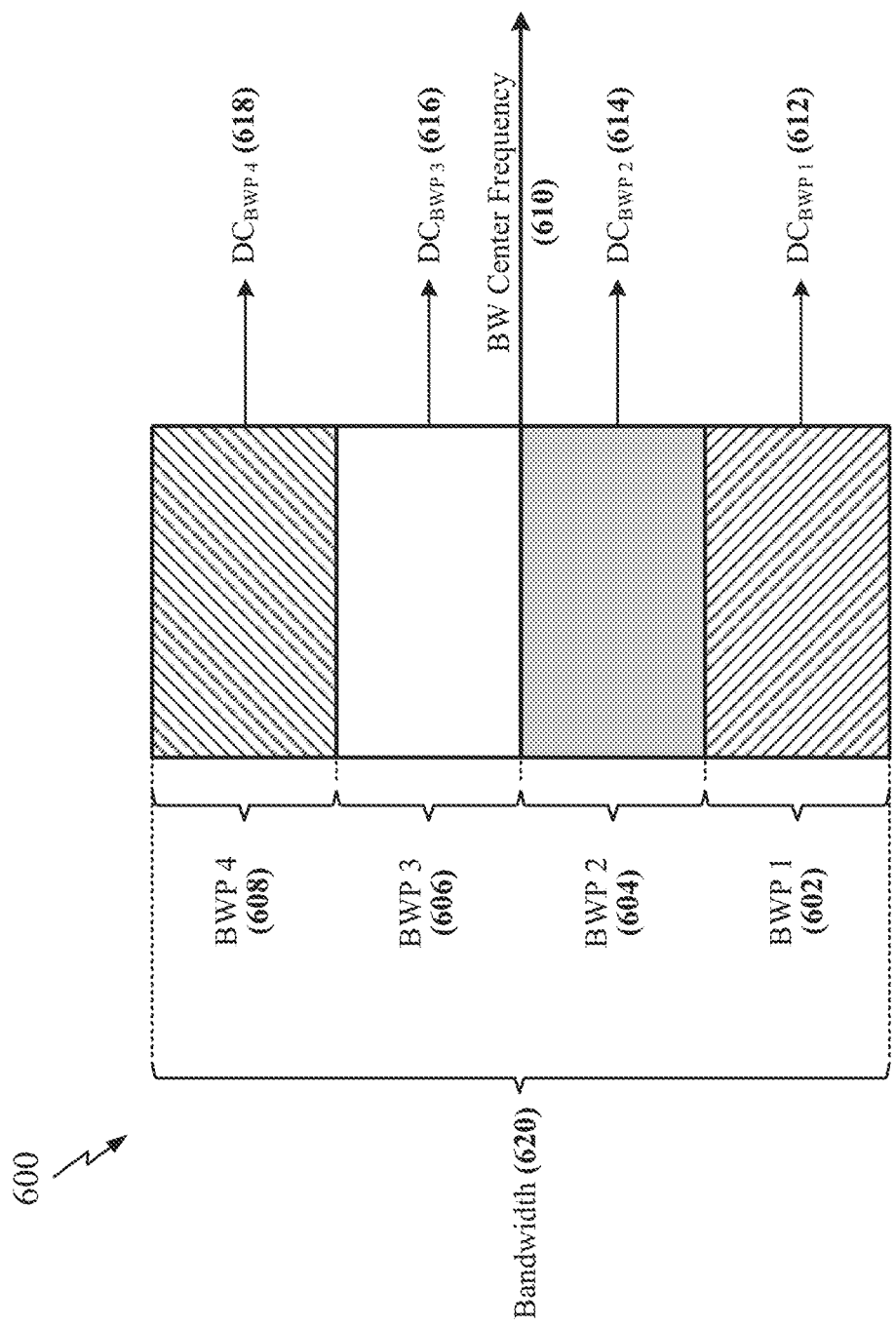
FIG. 6 illustrates a bandwidth that may be configured with multiple BWPs according to some aspects.

FIG. 6 illustrates a configuration 600 in which multiple BWPs 602, 604, 606, 608 may be defined at different frequency locations within a bandwidth 620 with center frequency 610. In one example, the BWPs 602, 604, 606, 608 may be configured with the same bandwidth. In some configurations, each BWP 602, 604, 606, 608 may have a common numerology (e.g., SCS and CP length).

In certain wireless access technology, the subcarrier corresponding to the center frequency of a resource block may be unused (e.g., not used for reference signals) to avoid possible leakage interference from the local oscillator (LO) in a transmitter when the LO is tuned to the center frequency. The subcarrier at or near the LO frequency may be referred to as the direct current (DC) subcarrier. In some aspects, the DC subcarrier or LO frequency may not be located at the center frequency of the bandwidth 620 depending on the RF front end configuration. In some networks, UEs are expected to report the location of a DC subcarrier to a scheduling entity (e.g., a base station, gNB). In some aspects, the UE may avoid using the DC subcarrier for some or all data communication with the scheduling entity. For example, the UE may not use the DC subcarrier for control channels or reference signals.

In some examples, the uplink DC subcarrier location may be reported by the UE for each configured BWP. For example, the parameter txDirectCurrentLocation in UplinkTxDirectCurrentList information element is reported using the RRCReconfigurationComplete message. As illustrated in Table 1 below, the value reported in the range 0-3299 represents the number (e.g., subcarrier index) of the DC subcarrier, the value 3300 indicates that the DC subcarrier is located outside the resource grid, and the value 3301 indicates that the position of the DC subcarrier in the uplink is undetermined.

TABLE 1

| Value | txDirectCurrentLocation |
| --- | --- |
| 0-3299 | DC subcarrier index within the carrier |
| 3300 | DC subcarrier outside the carrier |
| 3301 | DC subcarrier location undetermined |

Frequent reporting may be required when the UE reconfigures its RF front end to follow the BWP configuration in order to conserve power. DC subcarrier indication can be complex in a 5G NR network where multiple services may be provisioned or multiplexed, and where a UE can reconfigure its RF front end according to a current BWP configuration for power saving. In some examples, the UE can configure the RF bandwidth to be the widest supported bandwidth that can cover all configured BWPs.

In the example illustrated in FIG. 6, the RF bandwidth and DC subcarrier 612, 614, 616, 618 may change according to the frequency resources assigned to currently active BWPs 602, 604, 606, and 608. The DC subcarriers 612, 614, 616, and 618 may or may not correspond to the center frequencies of the BWPs 602, 604, 606 and 608, depending on the LO of the RF front end configuration. The UE may re-configure its RF front end in accordance with the active BWP configuration to obtain power savings. For example, the UE may re-configure its RF front end to match the bandwidth of a currently active BWP 602, 604, 606 or 608 and may tune the RF front end LO to the DC subcarrier 612, 614, 616, 618 of the currently active BWP 602, 604, 606 or 608. In some instances, the UE may operate its RF front end using an RF bandwidth based on the widest bandwidth, which may correspond to the full bandwidth 620 that covers all configured BWPs 602, 604, 606, and 608. The operating bandwidth may be selected based on UE implementation.

In another example, an intra-band carrier aggregation (CA) configuration may be associated with different DC subcarriers and may define multiple contiguous or non-contiguous CCs that share the same RF front end block, including power amplifiers, antennas, filters, etc.

Figure 7:
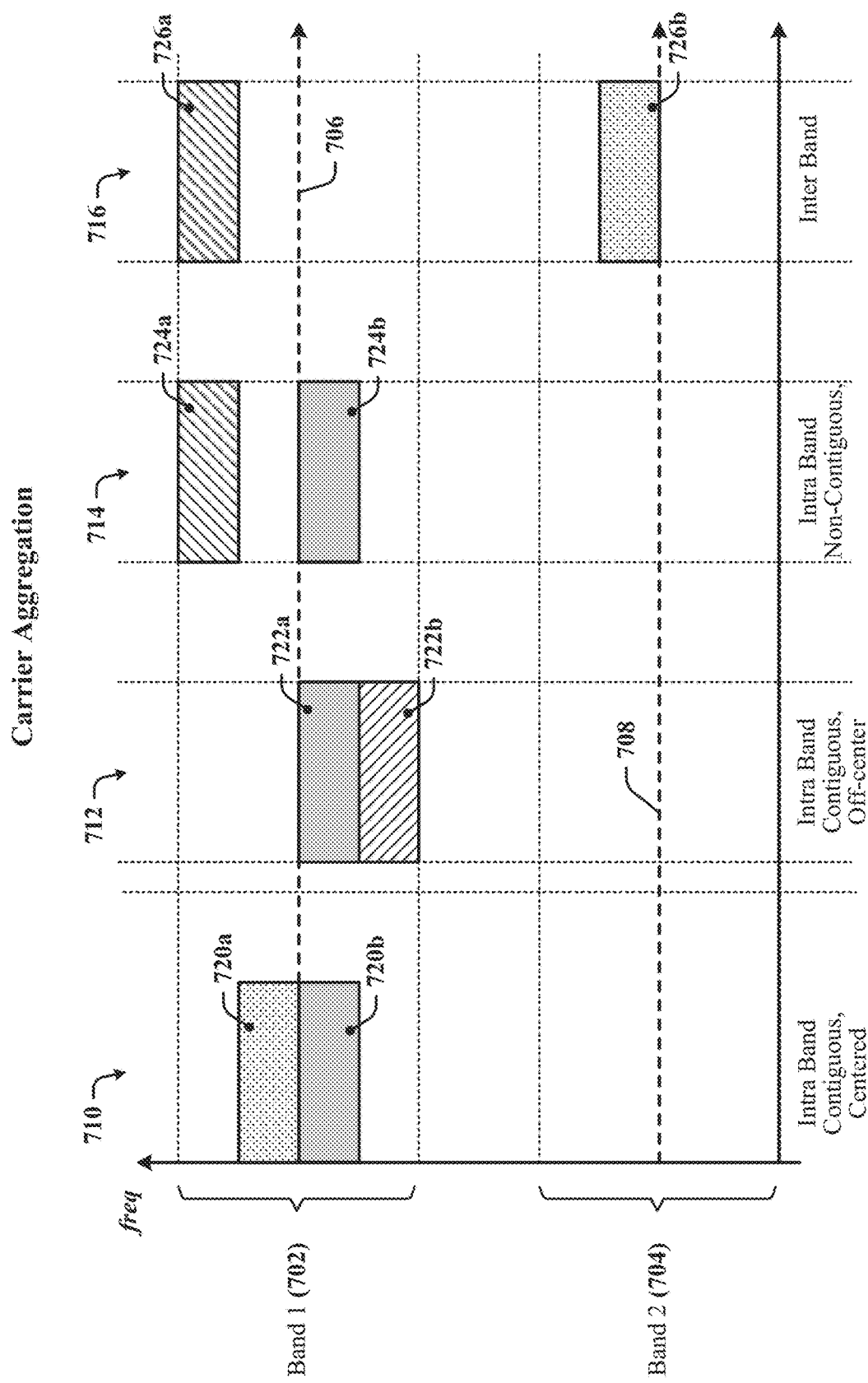
FIG. 7 illustrates carrier aggregation (CA) examples that may be associated with different DC subcarriers in a wireless communication network.

FIG. 7 illustrates examples of carrier aggregation (CA) that may be associated with different DC subcarriers in a wireless communication network. CA is used in certain RANs (e.g., 5G NR) to increase the data rate for one or more UEs by defining multiple contiguous or non-contiguous CCs on which the UE may communicate. In a first intra-band CA configuration 710, two contiguous CCs 720a, 720b centered on the center frequency 706 of a first band 702 are provisioned for a UE. A DC subcarrier defined for the contiguous CCs 720a, 720b may correspond to the center frequency 706 of the first band 702. In some examples, the DC subcarrier may not correspond to the center frequency 706 when the LO does not correspond to the center frequency 706. In a second intra-band CA configuration 712, the center frequency for combined contiguous CCs 722a, 722b is different from the center frequency 706 of the first band 702. A DC subcarrier defined for the combined contiguous CCs 722a, 722b may be different from the center frequency 706 of the first band 702. In a third intra-band CA configuration 714, two non-contiguous CCs 724a, 724b centered off the center frequency 706 of the first band 702 are provisioned for a UE. A single or multiple DC subcarriers can be defined including, for example, when the bandwidth of the RF front end of the UE matches the bandwidth of the first band 702, the bandwidth of the individual CCs 724a, 724b and the bandwidth spanning the CCs 724a, 724b.

In the inter-band CA configuration 716, CCs 726a, 726b located in different bands 702, 704 are provisioned for a UE. Multiple DC subcarriers can be defined including, for example, when the bandwidth of the RF front end of the UE matches the bandwidth of the bands 702, 704 and the bandwidth of the individual CCs 726a, 726b. In some UEs, contiguous or non-contiguous CCs may share the same RF front end block, including power amplifiers, antennas, filters, etc. In some systems, a single DC subcarrier location may be determined for CCs sharing the same RF front end.

In a CA configuration, each secondary CC (SCC) can be activated/deactivated at a UE. Each CC can be configured with more than one (up to 4) BWPs, one of which can be dynamically activated. Therefore, DC subcarrier location may change according to the states (active/inactive) of CCs and the combination of active BWPs across CCs. Conventional per-CC, per-BWP DC subcarrier location reporting may not be satisfactory or sufficient when dynamically activated BWPs are used. For example, the reporting of DC subcarrier location for dynamically activated BWPs may generate excessive overhead when the UE reports DC subcarrier location for all possible combinations of CCs and active BWPs, and the reporting overhead can grow exponentially with the number of BWPs configured for the UE. For example, there are 65,536 combinations of active BWPs when 8 CCs are configured and when each CC has 4 BWPs.

In one technique for reporting DC subcarrier location, the UE reports the operating point or frequency of its local oscillator (LO) after a BWP activation command. For example, DC subcarrier location may be provided using the UplinkTxDirectCurrentList that is reported using the RRCReconfigurationComplete message. In one example, a gNB may be configured to transmit a RRCReconfiguration message to the UE after each CC or BWP activation, and the UE can report the DC subcarrier location for the active BWPs in RRC signaling. In another example, the UE reports the LO position after CC or BWP activation using layer 1 or layer 2 (L1/L2) signaling.

In another technique for reporting DC subcarrier location, RRC signaling may be used to report an additional DC subcarrier location per BWP pair for all possible combinations of configured BWPs on the UL CCs. In one example, 4 BWPs configured for CC1 are identified as BWP1_1, BWP1_2, BWP1_3, and BWP1_4, while 4 BWPs configured for CC2 are identified as BWP2_1, BWP2_2, BWP2_3, and BWP2_4. In this example, the UE may report the DC subcarrier location for each possible BWP combination that can be activated simultaneously for intra-band UL CA, including:

DC1: BWP1_1+BWP2_1,
DC2: BWP1_1+BWP2_2,
DC3: BWP1_1+BWP2_3,
. . .
DC16: BWP1_4+BWP2_4.

Certain aspects of this disclosure provide techniques and procedures that may be used to report, identify, or configure DC subcarrier location when dynamically activated BWPs/CCs are configured for a UE. In some aspects, the UE may report DC subcarrier locations for a reduced set or subset of all possible combinations of CCs and BWPs. In some implementations, not all CCs and secondary CCS (SCCs) have many configured BWPs. For example, a SCC may have only one or two configured BWPs, including dormant and non-dormant BWPs. In some aspects, the DC subcarrier location report may not account for all combinations of active CCs and BWPs. Further, the number of supported combinations may be limited based on the capabilities of the UE or the base station. In one example, the transition to and from the dormant BWP can be simultaneously triggered across a group of SCCs, thus limiting the configurable combinations of CCs and BWPs. In another example, only the maximum bandwidth among the configured BWPs for a CC may be used for DC subcarrier location determination.

In certain aspects of the disclosure, the UE reports DC subcarrier location(s) for a reduced set (e.g., subset) of possible CC/BWP combinations. In one example, the base station may request the UE to provide the reduced set of CC/BWP combinations for the UE to report DC subcarrier locations. The request may be included in an RRCReconfiguration message. In another example, the UE may recommend constituents of the reduced set of CC/BWP combinations for reporting DC subcarrier locations. The recommendation may be included in an RRCReconfigurationComplete message.

In certain aspects of the disclosure, the BS can determine the list of CC/BWP combinations for which the UE is to report DC subcarrier location based on the UE's capability report. For example, the UE may report RF capabilities that may include the granularity of RF configuration, the number of power amplifiers or transmitter chains in the UE, and/or the number of configured intermediate frequencies. Granularity of RF configuration may relate to bandwidth and DC subcarrier location, for example.

One or more DC subcarrier locations may be reported for each combination of CC/BWP identified in the list. In one example, a UE that supports dual power amplifiers may use a different power amplifier for each active CC/BWP, and two DC subcarrier locations may be reported. In another example, each CC/BWP may have its own DC subcarrier location and the number of reported DC subcarrier locations is equal to the number of CCs/BWPs.

According to certain aspects, DC subcarrier location reports may be provided through one or more types of signaling. In one example, the DC subcarrier location reports may be signaled in a RRCReconfigurationComplete message transmitted after BWP configuration. In other examples, the DC subcarrier location reports may be provided in RRC signaling, medium access control (MAC) control element (MAC CE), or UCI transmission after secondary cell activation or deactivation, or after BWP switching. DC subcarrier location reporting may be event triggered. In some instances, the UE may autonomously report DC subcarrier location through RRC signaling, MAC CE, or UCI transmission.

Figure 8:
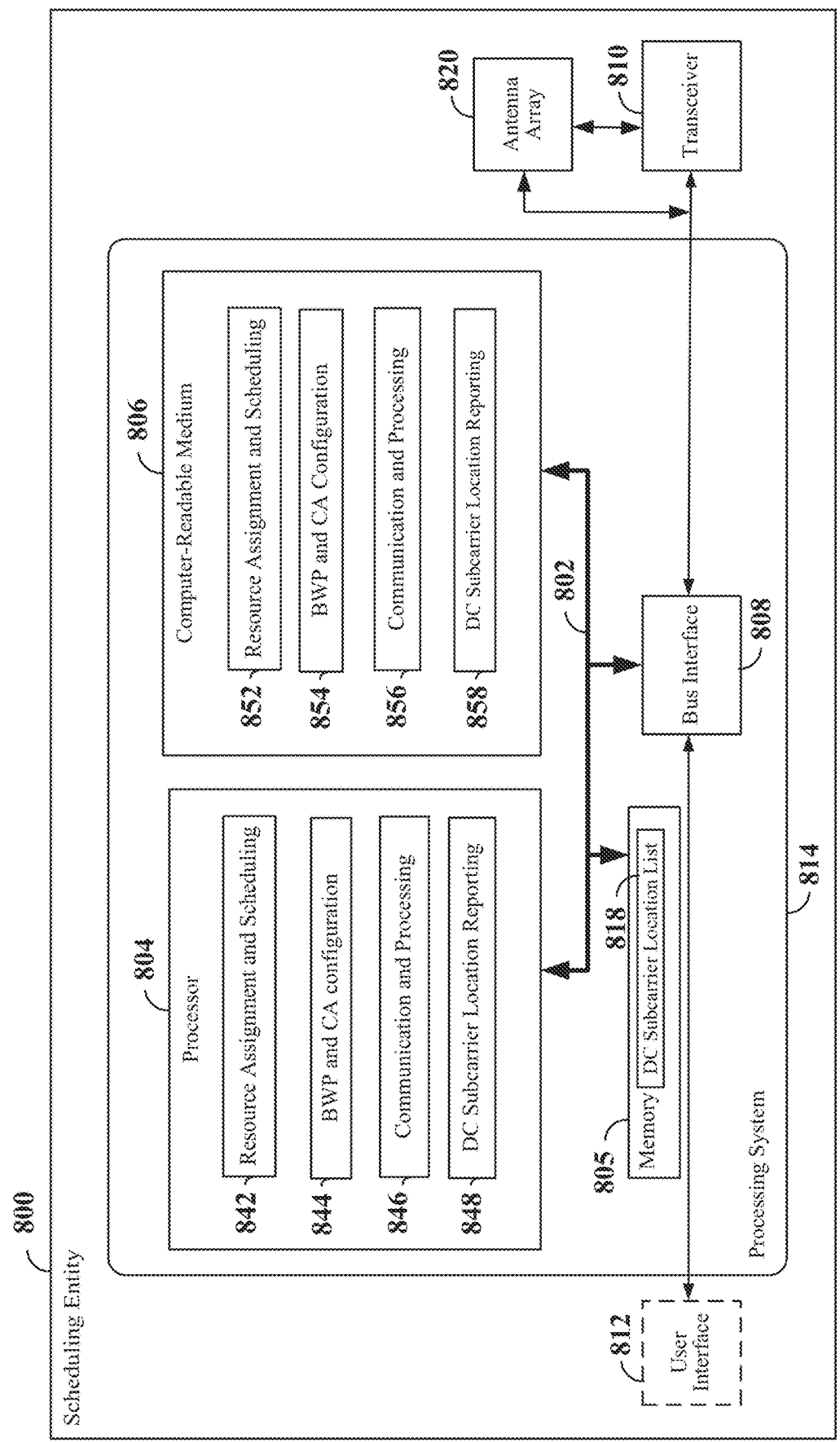
FIG. 8 is a block diagram illustrating an example of a hardware implementation for a scheduling entity employing a processing system according to some aspects.

FIG. 8 is a block diagram illustrating an example of a hardware implementation for a scheduling entity 800 employing a processing system 814. For example, the scheduling entity 800 may be a base station or gNB as illustrated in any one or more of FIGS. 1 and/or 2.

The scheduling entity 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 800 may be configured to perform any one or more of the functions described herein. That is, the processor 804, as utilized in a scheduling entity 800, may be used to implement any one or more of the processes and procedures described below and illustrated in FIGS. 9 and 10.

The processor 804 may in some instances be implemented via a baseband or modem chip and in other implementations, the processor 804 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 and antenna array 820 can provides a communication interface or means for communicating with various other apparatus over a transmission medium. Depending upon the nature of the apparatus, a user interface 812 (e.g., keypad, display, speaker, microphone, joystick, touchscreen) may also be provided. Of course, such a user interface 812 is optional, and may be omitted in some examples, such as a base station.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 804 may include circuitry configured for various functions, including, for example, DC subcarrier location reporting described herein.

In some aspects of the disclosure, the processor 804 may include resource assignment and scheduling circuitry 842. In some examples, the resource assignment and scheduling circuitry 842 may cooperate with BWP and CA configuration circuitry 844. The BWP and CA configuration circuitry 844 may be configured to define BWPs and/or CCs, and may allocate resources to a BWP or CC. The resource assignment and scheduling circuitry 842 may be further configured to allocate and/or schedule uplink and/or downlink resources, including resources allocated or scheduled for different combinations of BWPs and/or CCs. In one example, the resource assignment and scheduling circuitry 842 may configure reference signals for BWPs, CCs and/or BWPs, or sub-bands. The resource assignment and scheduling circuitry 842 may further be configured to execute resource assignment and scheduling software 852 stored in the computer-readable medium 806 to implement one or more of the functions described herein. The BWP and CA configuration circuitry 844 may further be configured to execute BWP and CA configuration software 854 stored in the computer-readable medium 806 to implement one or more of the functions described herein.

In some aspects of the disclosure, the processor 804 may include communication and processing circuitry 846 configured for various functions, including for example communicating with a network core (e.g., a 5G core network), scheduled entities (e.g., UE), or any other entity, such as, for example, local infrastructure or an entity communicating with the scheduling entity 800 via the Internet, such as a network provider. In some examples, the communication and processing circuitry 846 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 846 may include one or more transmit/receive chains. In addition, the communication and processing circuitry 846 may be configured to receive and process uplink traffic and uplink control messages (e.g., similar to uplink traffic 116 and uplink control 118 of FIG. 1), transmit and process downlink traffic and downlink control messages (e.g., similar to downlink traffic 112 and downlink control 114). The communication and processing circuitry 846 may further be configured to execute communication and processing software 856 stored on the computer-readable medium 806 to implement one or more functions described herein.

In some implementations where the communication involves receiving information, the communication and processing circuitry 846 may obtain information from a component of the wireless communication device 800 (e.g., from the transceiver 810 that receives the information via radio frequency signaling or some other type of signaling suitable for the applicable communication medium), process (e.g., decode) the information, and output the processed information. For example, the communication and processing circuitry 846 may output the information to another component of the processor 804, to the memory 805, or to the bus interface 808. In some examples, the communication and processing circuitry 846 may receive one or more of signals, messages, other information, or any combination thereof. In some examples, the communication and processing circuitry 846 may receive information via one or more channels. In some examples, the communication and processing circuitry 846 may include functionality for a means for receiving. In some examples, the communication and processing circuitry 846 may include functionality for a means for processing, including a means for demodulating, a means for decoding, etc.

In some implementations where the communication involves sending (e.g., transmitting) information, the communication and processing circuitry 846 may obtain information (e.g., from another component of the processor 804, the memory 805, or the bus interface 808), process (e.g., modulate, encode, etc.) the information, and output the processed information. For example, the communication and processing circuitry 846 may output the information to the transceiver 810 (e.g., that transmits the information via radio frequency signaling or some other type of signaling suitable for the applicable communication medium). In some examples, the communication and processing circuitry 846 may send one or more of signals, messages, other information, or any combination thereof. In some examples, the communication and processing circuitry 846 may send information via one or more channels. In some examples, the communication and processing circuitry 846 may include functionality for a means for sending (e.g., a means for transmitting). In some examples, the communication and processing circuitry 846 may include functionality for a means for generating, including a means for modulating, a means for encoding, etc.

In some aspects of the disclosure, the processor 804 may include DC subcarrier location reporting circuitry 848 configured to configure a UE to report DC subcarrier location for a subset of possible BWPs and CCs combinations, including generating one or more DC subcarrier location lists 818 for one or more UEs. The DC subcarrier location reporting circuitry 848 may further be configured to execute DC subcarrier location reporting software 858 stored on the computer-readable medium 806 to implement one or more functions described herein.

In certain examples, the DC subcarrier location reporting circuitry 848 may identify a list (e.g., DC subcarrier location list 818) including a subset of possible combinations of BWPs and CCs configured for a UE to report DC subcarrier location information, and configure the UE to use a first combination of the BWPs and CCs included in the list. The processing system 814 may receive the DC subcarrier location information for the first combination of BWPs and CCs from the UE. The DC subcarrier location information may identify one or more subcarrier numbers of one or more CCs configured at the UE. For example, the DC subcarrier location information may identify a subcarrier number of a CC of the first combination of BWPs and CCs. In some aspects, the processing system 814 may be configured to request the UE to provide recommendations of one or more combinations of BWPs and CCs for inclusion in the list. The processing system 814 may be further configured to determine one or more combinations of BWPs and CCs in the list from UE capability information received from the UE.

Figure 9:
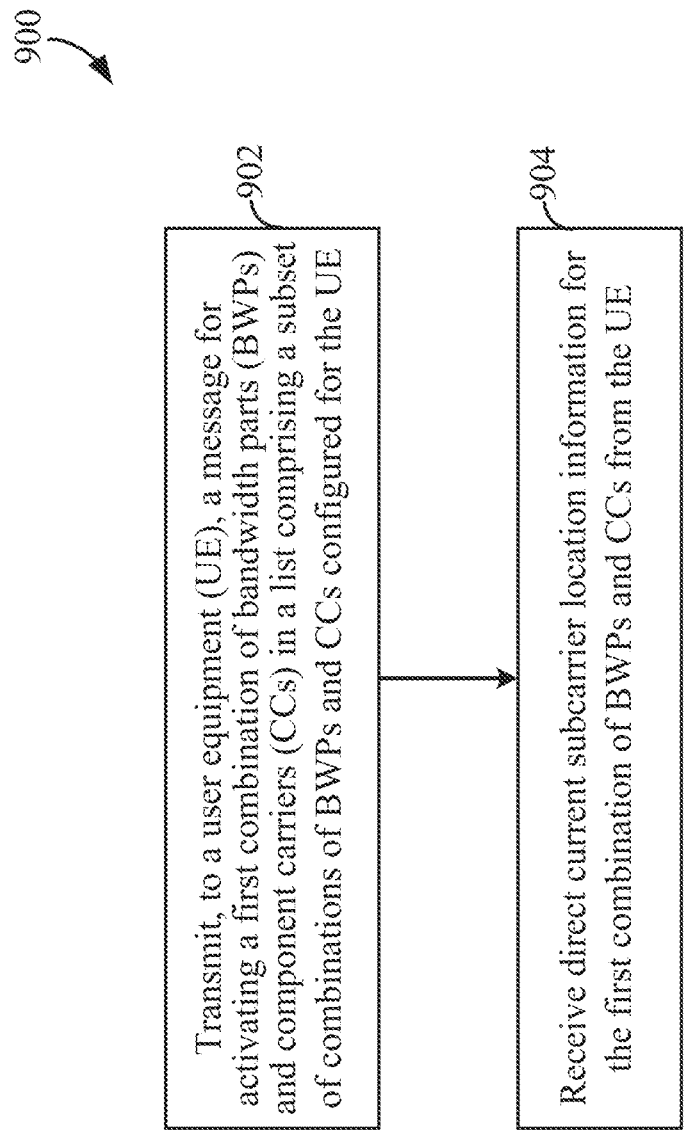
FIG. 9 is a flow chart of a method for reporting DC subcarrier location at a scheduling entity in a wireless communication network according to some aspects of the disclosure.

FIG. 9 is a flow chart illustrating an exemplary process 900 for reporting DC subcarrier location in accordance with some aspects of the present disclosure. As described below, some or all illustrated features may be omitted in a particular implementation within the scope of the present disclosure, and some illustrated features may not be required for all implementations. In some examples, the process 900 may be carried out by the scheduling entity 800 illustrated in FIG. 8. In some examples, the process 900 may be carried out by any suitable apparatus or means for carrying out the functions or algorithm described below.

At block 902, the scheduling entity (e.g., a base station or gNB) may transmit a message to a UE to activate a first combination of BWPs and CCs in a list including a subset of combinations of BWPs and CCs configured for the UE. In one aspect, the communication and processing circuitry 846 can provide a means to transmit the message, for example, a RRC message or MAC CE. In one aspect, the DC subcarrier location reporting circuitry 848 can provide a means to identify the list including a subset of possible combinations of BWPs and CCs configured for the UE. In one example, the scheduling entity can store the list in the memory 805. In one example, the possible combinations of BWPs and CCs include all configurable BWP and CC combinations that can be used by the scheduling entity. The subset of possible combinations of BWPs and CCs may depend on UE capability.

In one aspect, the BWP and CA configuration circuitry 844 can provide a means to configure the UE to use the first combination of the BWPs and CCs. The resource assignment and scheduling circuitry 842 can provide a means to schedule and allocate communication resources to the first combination of BWPs and CCs. The CCs can be configured for CA.

At block 904, the scheduling entity may receive the direct current (DC) subcarrier location information for the first combination of BWPs and CCs from the UE. In one aspect, the communication and processing circuitry 846 can provide a means to receive the direct current subcarrier location information via the transceiver 810. For example, the direct current subcarrier location information may be included in a RRC message, MAC-CE, or UCI. The DC subcarrier location reporting circuitry 848 can provide a means to identify one or more direct current subcarriers based on the received direct current subcarrier location information. For example, the direct current subcarrier location information may indicate one or more LOs of the UE's RF front end circuit.

In some aspects, the scheduling entity may initiate an RRC reconfiguration, and determine the list including a subset of possible combinations of BWPs and CCs using the RRC reconfiguration. In one example, the scheduling entity may request in a RRCReconfiguration message that the UE to provide the list, and the UE can recommend the list in a RRCReconfigurationComplete message.

In some aspects, the DC subcarrier location information may identify one or more subcarrier numbers of the first combination of BWPs and CCs. In some aspects, the scheduling entity may determine one or more combinations of BWPs and CCs in the list base on UE capability information received from the UE. The scheduling entity may receive the direct current subcarrier location information in an RRC message, a MAC-CE message, or uplink control information.

Figure 10:
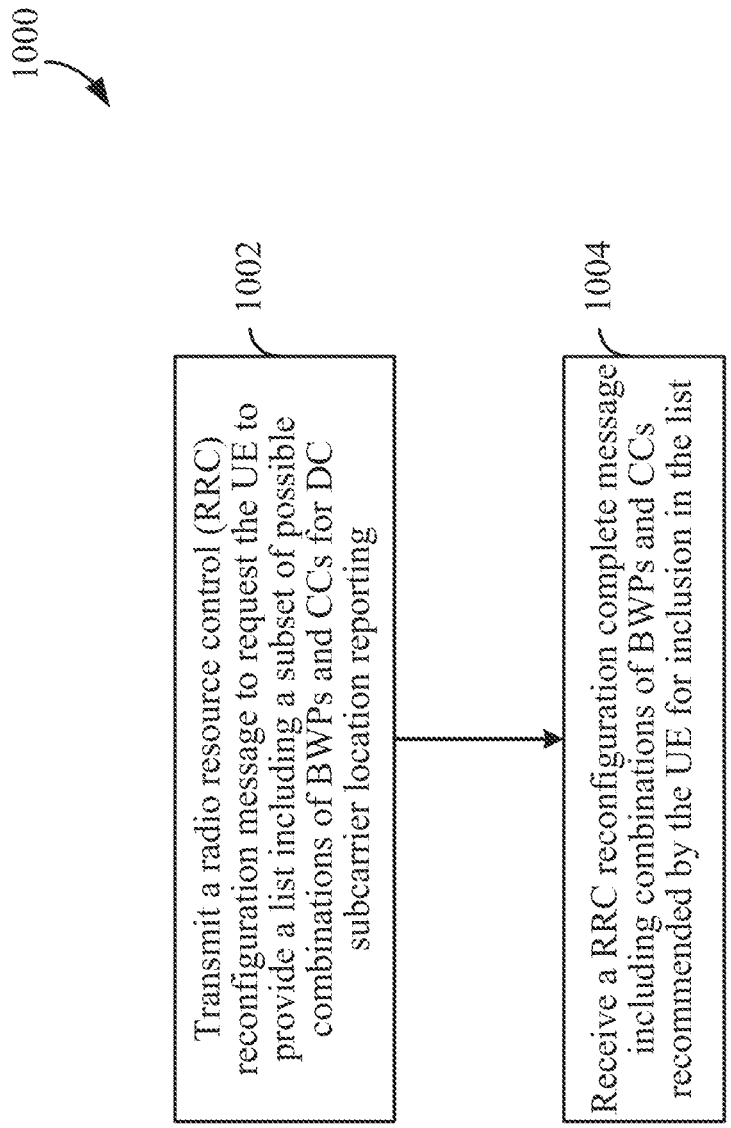
FIG. 10 is a flow chart illustrating an exemplary process for identifying DC subcarrier location according to some aspects of the disclosure.

FIG. 10 is a flow chart illustrating an exemplary process 1000 for identifying DC subcarrier location in accordance with some aspects of the present disclosure. In some examples, the process 1000 may be carried out by the scheduling entity 800 at block 902 of the process 900 described above.

At block 1002, the scheduling entity can transmit an RRC reconfiguration message to the UE. The RRC reconfiguration message may request the UE to provide a list including a subset of possible combinations of BWPs and CCs for DC subcarrier location reporting.

At block 1004, the scheduling entity may receive an RRC reconfiguration complete message from the UE. The RRC reconfiguration complete message may include a recommendation of combinations of BWPs and CCs for inclusion in the list. For example, the scheduling entity can include the combinations of BWPs and CCs recommended by the UE in the list (e.g., DC subcarrier location list 818).

In one configuration, the apparatus 800 for wireless communication includes means for performing the above functions described in relation to FIGS. 9 and 10. In one aspect, the aforementioned means may be the processor(s) 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1 and/or 2, and utilizing, for example, the processes and/or algorithms described herein in relation to FIGS. 9 and/or 10.

Figure 11:
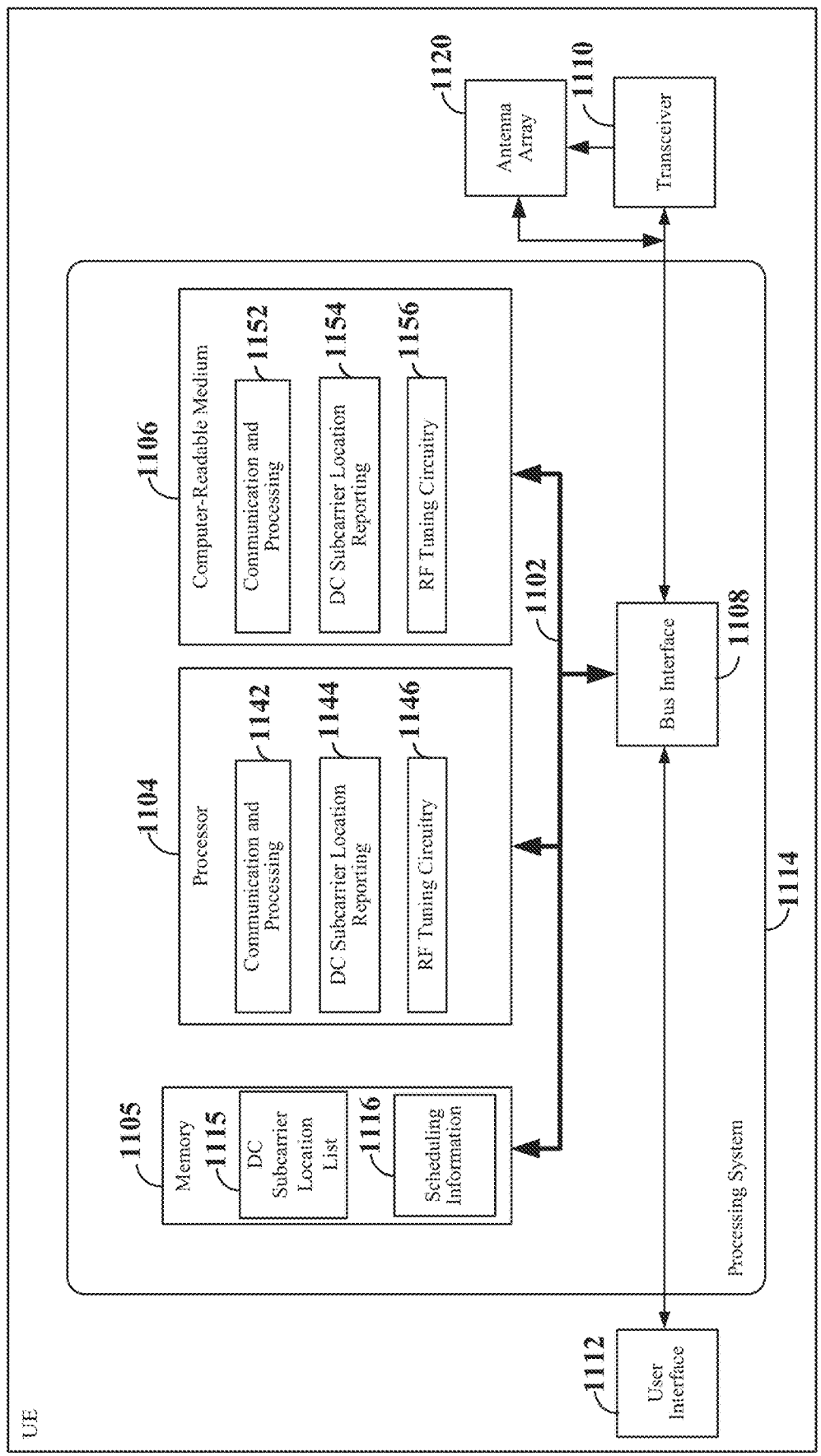
FIG. 11 is a block diagram illustrating an example of a hardware implementation for a user equipment (UE) employing a processing system according to some aspects.

FIG. 11 is a diagram illustrating an example of a hardware implementation for an exemplary scheduled entity 1100 employing a processing system 1114. In accordance with various aspects of the disclosure, an element, or any portion of an element, or any combination of elements may be implemented with a processing system 1114 that includes one or more processors 1104. For example, the scheduled entity 1100 may be a user equipment (UE) as illustrated in any one or more of FIGS. 1 and/or 2.

The processing system 1114 may be substantially the same as the processing system 1114 illustrated in FIG. 11, including a bus interface 1108, a bus 1102, memory 1105, a processor 1104, and a computer-readable medium 1106.

Furthermore, the scheduled entity 1100 may include a user interface 1112, a transceiver 1110, and an antenna array 1120 substantially similar to those described above in FIG. 8. That is, the processor 1104, as utilized in a scheduled entity 1100, may be used to implement any one or more of the processes described below and illustrated in FIGS. 12 and 13.

In some aspects of the disclosure, the processor 1104 may include circuitry configured for various functions. For example, the processor 1104 may include communication and processing circuitry 1142 configured for various functions, including for example communicating with scheduled entities using communication resources based on scheduling information 1116. In some examples, the communication and processing circuitry 1142 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1142 may include one or more transmit/receive chains. In addition, the communication and processing circuitry 1142 may be configured to transmit and process uplink traffic and uplink control messages (e.g., similar to uplink traffic 116 and uplink control 118 of FIG. 1), receive and process downlink traffic and downlink control messages (e.g., similar to downlink traffic 112 and downlink control 114). The communication and processing circuitry 1142 may further be configured to execute communication and processing software 1152 stored on the computer-readable medium 1106 to implement one or more functions described herein.

In some implementations where the communication involves receiving information, the communication and processing circuitry 1142 may obtain information from a component of the wireless communication device 1100 (e.g., from the transceiver 1110 that receives the information via radio frequency signaling or some other type of signaling suitable for the applicable communication medium), process (e.g., decode) the information, and output the processed information. For example, the communication and processing circuitry 1142 may output the information to another component of the processor 1104, to the memory 1105, or to the bus interface 1108. In some examples, the communication and processing circuitry 1142 may receive one or more of signals, messages, other information, or any combination thereof. In some examples, the communication and processing circuitry 1142 may receive information via one or more channels. In some examples, the communication and processing circuitry 1142 may include functionality for a means for receiving. In some examples, the communication and processing circuitry 1142 may include functionality for a means for processing, including a means for demodulating, a means for decoding, etc.

In some implementations where the communication involves sending (e.g., transmitting) information, the communication and processing circuitry 1142 may obtain information (e.g., from another component of the processor 1104, the memory 1105, or the bus interface 1108), process (e.g., modulate, encode, etc.) the information, and output the processed information. For example, the communication and processing circuitry 1142 may output the information to the transceiver 1110 (e.g., that transmits the information via radio frequency signaling or some other type of signaling suitable for the applicable communication medium). In some examples, the communication and processing circuitry 1142 may send one or more of signals, messages, other information, or any combination thereof. In some examples, the communication and processing circuitry 1142 may send information via one or more channels. In some examples, the communication and processing circuitry 1142 may include functionality for a means for sending (e.g., a means for transmitting). In some examples, the communication and processing circuitry 1142 may include functionality for a means for generating, including a means for modulating, a means for encoding, etc.

The processor 1104 may further include DC subcarrier location reporting circuitry 1144. The DC subcarrier location reporting circuitry 1144 may be configured to maintain a list (e.g., DC subcarrier location list 1115) of a subset of possible combinations of BWPs and CCs for which DC subcarrier location is to be reported. In some aspects, the DC subcarrier location reporting circuitry 1144 may recommend the list to a scheduling entity for DC subcarrier location reporting. The DC subcarrier location reporting circuitry 1144 may further be configured to execute DC subcarrier location reporting software 1154 stored on the computer-readable medium 1106 to implement one or more of the functions described herein.

The processor 1104 may further include RF tuning circuitry 1146. The RF tuning circuitry 1146 may support frequency hopping and may retune one or more components in the transceiver 1110 and/or the antenna array 1120. In some examples, the RF tuning circuitry 1146 may be configured to operate in coordination with the communication and processing circuitry 1142 to configure the transceiver 1110 to activate a combination of BWPs and CCs included in a list (e.g., DC subcarrier location list 1115) including combinations of BWPs and CCs. The BWPs and CC may include a portion of an operating bandwidth provided by a wireless communication network. The RF tuning circuitry 1146 may further be configured to execute RF tuning software 1156 stored on the computer-readable medium 1106 to implement one or more of the functions described herein, including the method illustrated in FIGS. 12 and 13.

Figure 12:
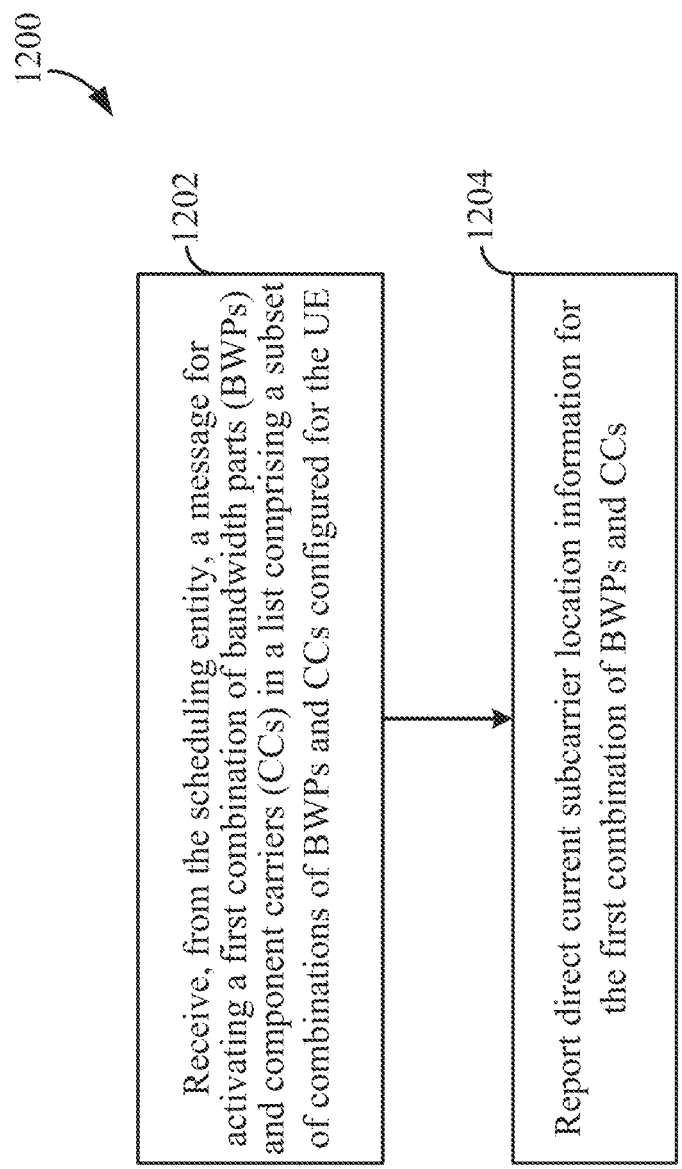
FIG. 12 is a flow chart of a method for DC subcarrier location reporting at a UE according to some aspects of the disclosure.

FIG. 12 is a flow chart illustrating an exemplary process 1200 for DC subcarrier location reporting at a UE in accordance with some aspects. As described below, some or all illustrated features may be omitted in a particular implementation within the scope of the present disclosure, and some illustrated features may not be required for all implementations. In some examples, the process 1200 may be carried out by the scheduled entity 1100 illustrated in FIG. 11. In some examples, the process 200 may be carried out by any suitable apparatus or means for carrying out the functions or algorithm described below.

At block 1202, a UE (a scheduled entity) can receive, from the scheduling entity, a message for activating a first combination of BWPs and CCs in a list comprising a subset of combinations of BWPs and CCs configured for the UE. In one aspect, the communication and processing circuitry 1142 can provide a means to receive the message to activate the first combination of BWPs and CCs. In one aspect, the DC subcarrier location reporting circuitry 1144 may provide a means to store the list (e.g., DC subcarrier location list 1115) in the memory 1105.

In one example, the CCs are for an intra-band CA configuration. In one aspect, the RF tuning circuitry 1146 may provide a means to activate the first combination of BWPs and CCs. For example, the RF tuning circuitry 1146 can tune the RF front end of the transceiver 1110 to use the first combination of BWPs and CCs to communicate with the scheduling entity.

At block 1204, the UE can report DC subcarrier location information for the first combination of BWPs and CCs. In one aspect, the DC subcarrier location reporting circuitry 1144 may provide a means to report the DC subcarrier location information, for example, the RF front end LO frequency. In some aspects, the communication and processing circuitry 1142 can provide a means to transmit the DC subcarrier location information to the scheduling entity via the transceiver 1110. In some aspects, the UE can transmit the DC subcarrier location information in an RRC message, MAC-CE, or UCI. The DC subcarrier location information may identify one or more subcarriers (e.g., subcarrier indexes).

Figure 13:
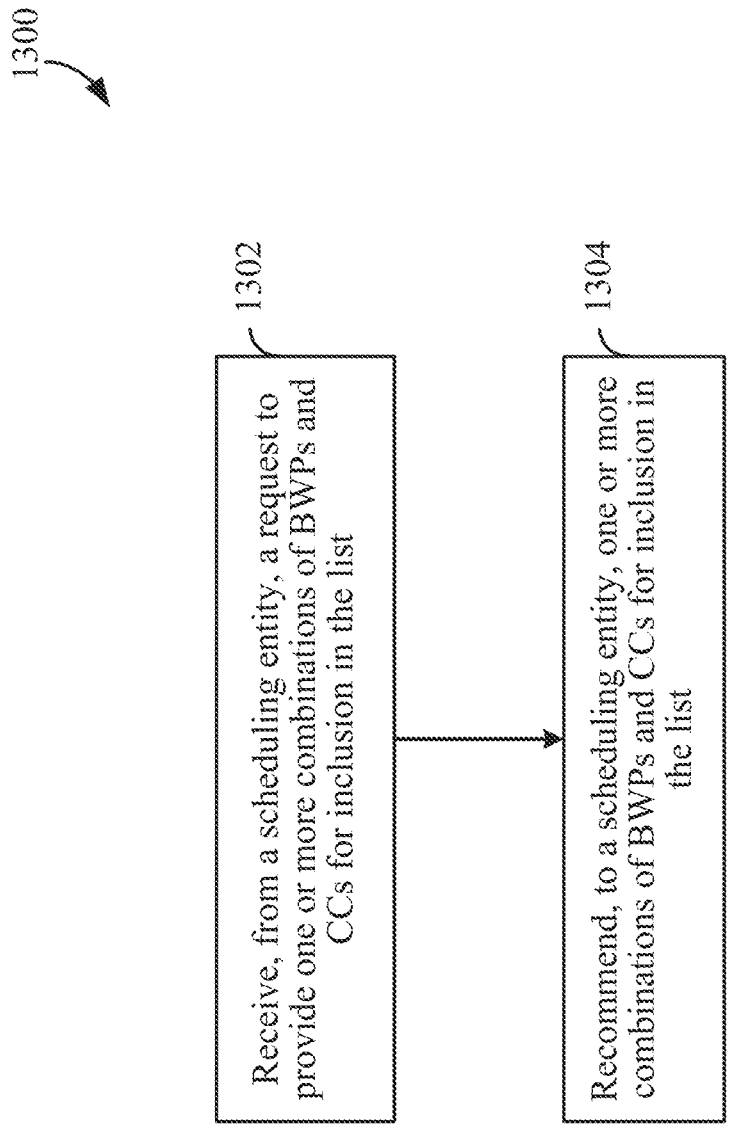
FIG. 13 is a flow chart illustrating an exemplary process for maintaining a subset of possible combinations of bandwidth parts and component carriers according to some aspects of the disclosure.

FIG. 13 is a flow chart illustrating an exemplary process 1300 for maintaining a list including a subset of possible combinations of BWPs and CCs configured for a UE in accordance with some aspects. In some examples, the process 1300 may be carried out by the scheduled entity 1100 of FIG. 11 described above. In one example, a UE (scheduled entity) can use an RRC reconfiguration procedure to determine or maintain the list. At 1302, the UE can receive an RRC reconfiguration message from a scheduling entity (e.g., gNB). The reconfiguration message may request the UE to provide a list including combinations of BWPs and CCs for DC subcarrier location reporting. In response, the UE can recommend one or more combinations of BWPs and CCs for inclusion in the list. For example, the UE can transmit an RRC reconfiguration complete message to the scheduling entity, and the RRC reconfiguration complete message may include a recommendation of combinations of BWPs and CCs for inclusion in the list.

In one configuration, the apparatus 1100 for wireless communication includes means for performing the functions and procedures described above in relation to FIGS. 12 and 13. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1 and/or 2, and utilizing, for example, the processes and/or algorithms described herein in relation to FIGS. 12 and/or 13.

In a first aspect, a user equipment (UE) for wireless communication is provided. The UE includes: a wireless transceiver configured for wireless communication with a scheduling entity; a memory; and a processor communicatively coupled to the wireless transceiver and the memory, wherein the processor and the memory are configured to: receive, from the scheduling entity, a message for activating a first combination of bandwidth parts (BWPs) and component carriers (CCs) in a list including a subset of combinations of BWPs and CCs configured for the UE; and report direct current subcarrier location information for the first combination of BWPs and CCs to the scheduling entity.

In a second aspect, alone or in combination with the first aspect, wherein the processor and the memory are further configured to: receive, from the scheduling entity, a request to provide one or more combinations of BWPs and CCs for inclusion in the list.

In a third aspect, alone or in combination with the second aspect, wherein the processor and the memory are further configured to: receive the request in a radio resource control (RRC) reconfiguration message.

In a fourth aspect, alone or in combination with any of the first to third aspects, wherein the processor and the memory are further configured to: transmit, to the scheduling entity, one or more combinations of BWPs and CCs for inclusion in the list.

In a fifth aspect, alone or in combination with any of the first to fourth aspects, wherein the direct current subcarrier location information identifies one or more subcarrier numbers of the first combination of BWPs and CCs.

In a sixth aspect, alone or in combination with any of the first to fifth aspects, wherein the direct current subcarrier location information identifies a subcarrier for each CC of the first combination of BWPs and CCs.

In a seventh aspect, alone or in combination with any of the first to sixth aspects, wherein the processor and the memory are further configured to: report the direct current subcarrier location information in a radio resource control (RRC), a medium access control (MAC) control element (MAC-CE) message, or uplink control information.

In an eighth aspect, alone or in combination with any of the first to seventh aspects, wherein the processor and the memory are further configured to: transmit UE capability information to the scheduling entity; and determine the combination of BWPs and CCs included in the list based on the UE capability information.

In a ninth aspect, a method for wireless communication at a user equipment (UE) is provided. The method includes: receiving, from a scheduling entity, a message for activating a first combination of bandwidth parts (BWPs) and component carriers (CCs) in a list including a subset of combinations of BWPs and CCs configured for the UE; and reporting direct current subcarrier location information for the first combination of BWPs and CCs to the scheduling entity.

In a tenth aspect, alone or in combination with the ninth aspect, the method further includes: receiving, from the scheduling entity, a request to provide one or more combinations of BWPs and CCs for inclusion in the list.

In an eleventh aspect, alone or in combination with the tenth aspect, wherein the receiving includes: receiving the request in a radio resource control (RRC) reconfiguration message.

In a twelfth aspect, alone or in combination with any of the ninth to eleventh aspects, the method further includes: transmitting, to the scheduling entity, one or more combinations of BWPs and CCs for inclusion in the list.

In a thirteenth aspect, alone or in combination with any of the ninth to twelfth aspects, wherein the direct current subcarrier location information identifies one or more subcarrier numbers of the first combination of BWPs and CCs.

In a fourteenth aspect, alone or in combination with any of the ninth to thirteenth aspects, wherein the direct current subcarrier location information identifies a subcarrier for each CC of the first combination of BWPs and CCs.

In a fifteenth aspect, alone or in combination with any of the ninth to fourteenth aspects, wherein the reporting includes: reporting the direct current subcarrier location information in a radio resource control (RRC) message, a medium access control (MAC) control element (MAC-CE) message, or uplink control information.

In a sixteenth aspect, alone or in combination with any of the ninth to fifteenth aspects, the method further includes: transmitting UE capability information to the scheduling entity; and determining the combination of BWPs and CCs included in the list based on the UE capability information.

In a seventeenth aspect, a base station for wireless communication is provided. The base station includes: a wireless transceiver; a memory; and a processor communicatively coupled to the wireless transceiver and the memory, wherein the processor and the memory are configured to: transmit, to a user equipment (UE), a message for activating a first combination of bandwidth parts (BWPs) and component carriers (CCs) in a list including a subset of combinations of BWPs and CCs configured for the UE; and receive direct current subcarrier location information for the first combination of BWPs and CCs from the UE.

In an eighteenth aspect, alone or in combination with the seventeenth aspect, wherein the processor and the memory are further configured to: request the UE to provide one or more combinations of BWPs and CCs for inclusion in the list.

In a nineteenth aspect, alone or in combination with the eighteenth aspect, wherein the processor and the memory are further configured to: transmit a radio resource control (RRC) reconfiguration message to request the UE to provide one or more combinations of BWPs and CCs for inclusion in the list.

In a twentieth aspect, alone or in combination with any of the eighteenth to nineteenth aspects, wherein the processor and the memory are further configured to: receive from the UE a recommendation of one or more combinations of BWPs and CCs for inclusion in the list.

In a twenty-first aspect, alone or in combination with any of the seventeenth to twentieth aspects, wherein the direct current subcarrier location information identifies one or more subcarrier numbers of the first combination of BWPs and CCs.

In a twenty-second aspect, alone or in combination with any of the seventeenth to twenty-first aspects, wherein the processor and the memory are further configured to: determine one or more combinations of BWPs and CCs in the list based on capability information received from the UE.

In a twenty-third aspect, alone or in combination with any of the seventeenth to twenty-second aspects, wherein the processor and the memory are further configured to: receive the direct current subcarrier location information in a radio resource control (RRC) message, a medium access control (MAC) control element (MAC-CE) message, or uplink control information.

In a twenty-fourth aspect, a method for wireless communication at a base station is provided. The method includes: transmitting, to a user equipment (UE), a message for activating a first combination of bandwidth parts (BWPs) and component carriers (CCs) in a list including a subset of combinations of BWPs and CCs configured for the UE; and receiving direct current subcarrier location information for the first combination of BWPs and CCs from the UE.

In a twenty-fifth aspect, alone or in combination with the twenty-fourth aspect, the method further includes: requesting the UE to provide one or more combinations of BWPs and CCs for inclusion in the list.

In a twenty-sixth aspect, alone or in combination with the twenty-fifth aspect, wherein the requesting comprises: transmitting a radio resource control (RRC) reconfiguration message to request the UE to provide one or more combinations of BWPs and CCs for inclusion in the list.

In a twenty-seventh aspect, alone or in combination with any of the twenty-fifth to twenty-sixth aspects, the method further includes: receiving from the UE a recommendation of one or more combinations of BWPs and CCs for inclusion in the list.

In a twenty-eighth aspect, alone or in combination with any of the twenty-four to twenty-seventy aspects, wherein the direct current subcarrier location information identifies one or more subcarrier numbers of the first combination of BWPs and CCs.

In a twenty-ninth aspect, alone or in combination with any of the twenty-four to twenty-eighth aspects, the method further includes: determining one or more combinations of BWPs and CCs in the list based on capability information received from the UE.

In a thirtieth aspect, alone or in combination with any of the twenty-four to twenty-ninth aspects, the method further includes: receiving the direct current subcarrier location information in a radio resource control (RRC) message, a medium access control (MAC) control element (MAC-CE) message, or uplink control information.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A user equipment (UE) for wireless communication, comprising:
one or more memories; and
one or more processors coupled to the one or more memories, wherein the one or more processors are configured to:
receive, from a scheduling entity, a request to provide one or more combinations of bandwidth parts (BWPs) and component carriers (CCs) for inclusion in a list comprising a subset of possible combinations of BWPs and CCs;
transmit, to the scheduling entity, a message comprising a recommendation of the one or more combinations of BWPs and CCs for inclusion in the list;
activate a first combination of BWPs and CCs in the list; and
report direct current subcarrier location information for the first combination of BWPs and CCs to the scheduling entity.

2. The UE of claim 1, wherein the one or more processors are further configured to:
receive the request in a radio resource control (RRC) reconfiguration message.

3. The UE of claim 1, wherein the one or more processors are further configured to:
transmit, to the scheduling entity, a radio resource control (RRC) message comprising the recommendation of one or more combinations of BWPs and CCs for inclusion in the list.

4. The UE of claim 1, wherein the direct current subcarrier location information identifies one or more subcarrier numbers of the first combination of BWPs and CCs.

5. The UE of claim 1, wherein the direct current subcarrier location information identifies a subcarrier for each CC of the first combination of BWPs and CCs.

6. The UE of claim 1, wherein the one or more processors are further configured to:
report the direct current subcarrier location information in a radio resource control (RRC), a medium access control (MAC) control element (MAC-CE) message, or uplink control information.

7. A method for wireless communication at a user equipment (UE), the method comprising:
receiving, from a scheduling entity, a request to provide one or more combinations of bandwidth parts (BWPs) and component carriers (CCs) for inclusion in a list comprising a subset of possible combinations of BWPs and CCs;
transmitting, to the scheduling entity, a message comprising a recommendation of the one or more combinations of BWPs and CCs for inclusion in the list;
activating a first combination of BWPs and CCs in the list; and
reporting direct current subcarrier location information for the first combination of BWPs and CCs to the scheduling entity.

8. The method of claim 7, wherein the receiving comprises:
receiving the request in a radio resource control (RRC) reconfiguration message.

9. The method of claim 7, further comprising:
transmitting, to the scheduling entity, a radio resource control (RRC) message comprising the recommendation of one or more combinations of BWPs and CCs for inclusion in the list.

10. The method of claim 7, wherein the direct current subcarrier location information identifies one or more subcarrier numbers of the first combination of BWPs and CCs.

11. The method of claim 7, wherein the direct current subcarrier location information identifies a subcarrier for each CC of the first combination of BWPs and CCs.

12. The method of claim 7, wherein the reporting comprises:
reporting the direct current subcarrier location information in a radio resource control (RRC) message, a medium access control (MAC) control element (MAC-CE) message, or uplink control information.

13. A base station for wireless communication, comprising:
one or more memories; and
one or more processors coupled to the one or more memories, wherein the one or more processors are configured to:
request a user equipment (UE) to provide one or more combinations of bandwidth parts (BWPs) and component carriers (CCs) for inclusion in a list comprising a subset of possible combinations of BWPs and CCs;
receive, from the UE, a message comprising a recommendation of the one or more combinations of BWPs and CCs for inclusion in the list;

activate a first combination of BWPs and CCs in the list; and receive direct current subcarrier location information for the first combination of BWPs and CCs from the UE.

14. The base station of claim 13, wherein the one or more processors are further configured to:

transmit a radio resource control (RRC) reconfiguration message to request the UE to provide one or more combinations of BWPs and CCs for inclusion in the list.

15. The base station of claim 13, wherein the one or more processors are further configured to:

receive from the UE a radio resource control (RRC) message comprising the recommendation of one or more combinations of BWPs and CCs for inclusion in the list.

16. The base station of claim 13, wherein the direct current subcarrier location information identifies one or more subcarrier numbers of the first combination of BWPs and CCs.

17. The base station of claim 13, wherein the one or more processors are further configured to:

determine one or more combinations of BWPs and CCs in the list based on capability information received from the UE.

18. The base station of claim 13, wherein the one or more processors are further configured to:

receive the direct current subcarrier location information in a radio resource control (RRC) message, a medium access control (MAC) control element (MAC-CE) message, or uplink control information.

19. A method for wireless communication at a base station configured for wireless communication, the method comprising:

requesting a user equipment (UE) to provide one or more combinations of bandwidth parts (BWPs) and component carriers (CCs) for inclusion in a list comprising a subset of possible combinations of BWPs and CCs;

receiving, from the UE, a message comprising a recommendation of the one or more combinations of BWPs and CCs for inclusion in the list;

activating a first combination of BWPs and CCs in the list; and receiving direct current subcarrier location information for the first combination of BWPs and CCs from the UE.

20. The method of claim 19, wherein the requesting comprises:

transmitting a radio resource control (RRC) reconfiguration message to request the UE to provide one or more combinations of BWPs and CCs for inclusion in the list.

21. The method of claim 19, further comprising:

receiving from the UE a radio resource control (RRC) message comprising the recommendation of one or more combinations of BWPs and CCs for inclusion in the list.

22. The method of claim 19, wherein the direct current subcarrier location information identifies one or more subcarrier numbers of the first combination of BWPs and CCs.

23. The method of claim 19, further comprising:

determining one or more combinations of BWPs and CCs in the list based on capability information received from the UE.

24. The method of claim 19, further comprising:

receiving the direct current subcarrier location information in a radio resource control (RRC) message, a medium access control (MAC) control element (MAC-CE) message, or uplink control information.

* * * * *